United States Patent
Sezgin et al.

(10) Patent No.: US 8,130,730 B2
(45) Date of Patent: *Mar. 6, 2012

(54) USER EQUIPMENT FOR SYNCHRONIZING TO A TDD BASE STATION

(75) Inventors: Nadir Sezgin, Brooklyn, NY (US); Fatih Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/499,918

(22) Filed: Jul. 9, 2009

(65) Prior Publication Data

US 2009/0268644 A1     Oct. 29, 2009

Related U.S. Application Data

(63) Continuation of application No. 11/505,575, filed on Aug. 17, 2006, now Pat. No. 7,596,105, which is a continuation of application No. 10/695,276, filed on Oct. 28, 2003, now Pat. No. 7,102,994, which is a continuation of application No. 09/576,363, filed on May 22, 2000, now Pat. No. 6,717,930.

(51) Int. Cl.
*H04B 7/216* (2006.01)

(52) U.S. Cl. ........ 370/335; 370/209; 370/280; 370/324; 370/342; 370/350; 370/503; 370/514; 375/145

(58) Field of Classification Search .................. 370/208, 370/209, 280, 324, 335, 342, 350, 503, 514; 375/145

See application file for complete search history.

(56) References Cited

U.S. PATENT DOCUMENTS

| | | | |
|---|---|---|---|
| 5,164,958 A | | 11/1992 | Omura |
| 5,559,789 A | * | 9/1996 | Nakano et al. ................. 370/342 |
| 5,715,521 A | * | 2/1998 | Fukasawa et al. .............. 455/69 |
| 5,802,102 A | | 9/1998 | Davidovici et al. |
| 6,078,607 A | * | 6/2000 | Monroe et al. ................. 375/145 |
| 6,173,006 B1 | | 1/2001 | Kent et al. |
| 6,185,244 B1 | * | 2/2001 | Nystrom et al. .............. 375/145 |

(Continued)

FOREIGN PATENT DOCUMENTS

WO     99/12273     3/1999

(Continued)

OTHER PUBLICATIONS

3GPP, "3$^{rd}$ Generation Partnership Project (3GPP); Technical Specification Group (TSG) RAN NBAP Specification," 3G TS 25.433 V1.0.0 (Apr. 1999).

(Continued)

*Primary Examiner* — Christopher Grey
(74) *Attorney, Agent, or Firm* — Volpe and Koenig, P.C.

(57) ABSTRACT

A time division duplex (TDD) user equipment (UE) is configured to synchronize to a TDD base station. The UE includes an antenna, a primary synchronization code matched filter, a first plurality of secondary synchronization code matched filters, a second plurality of secondary synchronization code matched filters, and a processor in communication with the first and second plurality of secondary synchronization code matched filters. The first plurality of secondary synchronization code matched filters determines secondary synchronization codes sent on a first carrier and the second plurality of secondary synchronization code matched filters determines secondary synchronization codes sent on a second carrier. The processor is configured to determine a code group assignment and selected timeslot based upon an analysis of the secondary synchronization codes sent on the first and second carriers.

5 Claims, 11 Drawing Sheets

U.S. PATENT DOCUMENTS

| | | | |
|---|---|---|---|
| 6,185,284 B1 | 2/2001 | Goodman et al. | |
| 6,246,673 B1* | 6/2001 | Tiedemann et al. | 370/333 |
| 6,317,413 B1 | 11/2001 | Honkasalo | |
| 6,363,060 B1* | 3/2002 | Sarkar | 370/342 |
| 6,385,264 B1 | 5/2002 | Terasawa et al. | |
| 6,473,395 B1 | 10/2002 | Lee | |
| 6,526,091 B1* | 2/2003 | Nystrom et al. | 375/142 |
| 6,665,277 B1 | 12/2003 | Sriram | |
| 6,717,930 B1* | 4/2004 | Sezgin et al. | 370/335 |
| 6,741,578 B1* | 5/2004 | Moon et al. | 370/335 |
| 6,865,177 B1 | 3/2005 | Park et al. | |
| 6,990,091 B2* | 1/2006 | Sarkar | 370/342 |
| 7,095,723 B2* | 8/2006 | Sezgin et al. | 370/324 |
| 7,102,994 B2* | 9/2006 | Sezgin et al. | 370/209 |
| 7,596,105 B2* | 9/2009 | Sezgin et al. | 370/280 |
| 7,720,496 B2* | 5/2010 | Sriram | 455/502 |
| 2004/0057414 A1 | 3/2004 | Sriram | |

FOREIGN PATENT DOCUMENTS

| | | |
|---|---|---|
| WO | 99/12295 | 3/1999 |

OTHER PUBLICATIONS

3GPP, "3$^{rd}$ Generation Partnership Project (3GPP); Technical Specification Group (TSG) Radio Access Network (RAN); Working Group 1 (WG1); Physical Layer Procedures (TDD)," 3G TS 25.224 V1.0.0 (Apr. 1999).

3GPP, "3$^{rd}$ Generation Partnership Project (3GPP); Technical Specification Group (TSG) Radio Access Network (RAN); Working Group 1 (WG1); Spreading and Modulation (TDD)," 3G TS 25.223 V2.0.0 (Apr. 1999).

3GPP, "3$^{rd}$ Generation Partnership Project (3GPP); Technical Specification Group (TSG) Radio Access Network (RAN); Working Group 1 (WG1); Physical Channels and Mapping of Transport Channels onto Physical Channels (TDD)," 3G TS 25.221 V1.0.0 (Apr. 1999).

3GPP, "3$^{rd}$ Generation Partnership Project; Technical Specification Group Radio Access Network; UTRAN lub Interface NBAP Signalling (Release 1999)," 3G TS 25.433 V3.1.0 (Mar. 2000).

3GPP, "3$^{rd}$ Generation Partnership Project; Technical Specification Group Radio Access Network; Physical Layer Procedures (TDD) (Release 1999)," 3G TS 25.224 V3.2.0 (Mar. 2000).

3GPP, "3$^{rd}$ Generation Partnership Project; Technical Specification Group Radio Access Network; Spreading and Modulation (TDD) (Release 1999)," 3G TS 25.223 V3.2.0 (Mar. 2000).

3GPP, "3$^{rd}$ Generation Partnership Project; Technical Specification Group Radio Access Network; Physical Channels and Mapping of Transport Channels onto Physical Channels (TDD) (Release 1999)," 3G TS 25.221 V3.2.0 (Mar. 2000).

Nadir Sezgin and Fatih Ozluturk, "BPSK Modulated Secondary Synchronization Codes for Cell Search in UTRA TDD", May 28, 2000.

TSG-RAN Working Group 1 (Radio) Meeting #3, "A New Hierarchical Correlation Sequence with Good Properties in Presence of a Frequency Error", Eskilstuna, Sweden, Mar. 22-26, 1999.

TSG-RAN Working Group 1 Meeting #2, "Synchronization Channel with Cyclic Hierarchical Sequences", Yokohama, Japan, Feb. 22-25, 1999.

TSG-RAN Working Group 1 Meeting #5, "BPSK Modulated Secondary Synchronization Codes Based Cell Search in UTRA TDD", Cheju, South Korea, Jun. 1-4, 1999.

3GPP, "3$^{rd}$ Generation Partnership Project (3GPP); Technical Specification Group (TSG) RAN NBAP Specification," 3G TS 25.433 V1.0.0 (Apr. 1999).

3GPP, "3$^{rd}$ Generation Partnership Project (3GPP); Technical Specification Group (TSG) Radio Access Network (RAN); Working Group 1 (WG1); Physical Layer Procedures (TDD)," 3G TS 25.224 V1.0.0 (Apr. 1999).

3GPP, "3$^{rd}$ Generation Partnership Project (3GPP); Technical Specification Group (TSG) Radio Access Network (RAN); Working Group 1 (WG1); Spreading and Modulation (TDD)," 3G TS 25.223 V2.0.0 (Apr. 1999).

3GPP, "3$^{rd}$ Generation Partnership Project (3GPP); Technical Specification Group (TSG) Radio Access Network (RAN); Working Group 1 (WG1); Physical Channels and Mapping of Transport Channels onto Physical Channels (TDD)," 3G TS 25.221 V1.0.0 (Apr. 1999).

3GPP, "3$^{rd}$ Generation Partnership Project; Technical Specification Group Radio Access Network; UTRAN lub Interface NBAP Signalling (Release 1999)," 3G TS 25.433 V3.1.0 (Mar. 2000).

3GPP, "3$^{rd}$ Generation Partnership Project; Technical Specification Group Radio Access Network; Physical Layer Procedures (TDD) (Release 1999)," 3G TS 25.224 V3.2.0 (Mar. 2000).

3GPP, "3$^{rd}$ Generation Partnership Project; Technical Specification Group Radio Access Network; Spreading and Modulation (TDD) (Release 1999)," 3G TS 25.223 V3.2.0 (Mar. 2000).

3GPP, "3$^{rd}$ Generation Partnership Project; Technical Specification Group Radio Access Network; Physical Channels and Mapping of Transport Channels onto Physical Channels (TDD) (Release 1999)," 3G TS 25.221 V3.2.0 (Mar. 2000).

Texas Instruments and InterDigital Communications Corp., "Modulated Length 2 and Length 4 CFC with Greater Minimum Distance," TSG-RAN Working Group 1 Meeting #7, Hannover, Germany, Aug. 30-Sep. 3, 1999.

3GPP TSG-RAN Working Group 1 Meeting #4, "Calculation of $t_{offset}$ for Physical Synchronization Channel in TDD Mode", Shin Yokohama, Apr. 18-20, 1999.

3GPP, "3$^{rd}$ Generation Partnership Project; Technical Specification Group Radio Access Network; Spreading and Modulation (TDD) (Release 1999)," 3G TS 25.223 V3.2.0 (Mar. 2000).

3GPP, "3$^{rd}$ Generation Partnership Project; Technical Specification Group Radio Access Network; Physical Channels and Mapping of Transport Channels onto Physical Channels (TDD) (Release 1999)," 3G TS 25.221 V3.2.0 (Mar. 2000).

Drafting Session, "Draft liaison statement to WG4 on work split between WG1 and WG4 on Radio link procedures," TSG-RAN Working Group 1 meeting #2, TSGW1#2(99)123 (Feb. 22-25, 1999).

Editor, "Document 25.213 V2.0.1," TSG-RAN Working Group 1 (Radio) meeting #5, TSGR1#5(99)601 (Jun. 1-4, 1999).

ETSI SMG2 UMTS, Physical Layer Expert Group Meeting #2, "Comma Free Codes for Fast PN Code Acquisition in WCDMA Systems: A Proposal for the UTRA Concept", Paris, France, Apr. 28, 1998.

European Telecommunications Standards Institute, "Universal Mobile Telecommunications System (UMTS); UMTS Terretrial Radio Access (UTRA); Concept Evaluation", (UMTS 30.06 version 3.0.0), (1997).

France Telecom, "Potential downlink power control instabilities during soft handover," TSG-RAN Working Group 1 meeting #3, TSGR#3(99)213 (Mar. 22-26, 1999).

InterDigital Communications Corporation, "QPSK Modulated Secondary Synchronization Codes (SSC) Algorithm", Aug. 9, 1999.

K. Higuchi, M. Sawahashi and F. Adachi, "Fast Cell Search Algorithm in DS-CDMA Mobile Radio Using Long Spreading Codes", (1997), pp. 1430-1434.

Nadir Sezgin and Fatih Ozluturk, "BPSK Modulated Secondary Synchronization Codes for Cell Search in UTRA TDD", May 28, 2000.

Sony International (Europe) CMBH, "Slotted mode in UTRA FDD downlink," 3GPP TSG RAN Working group 1 meeting #3, TSGR1#3(99)-175 (Mar. 22-26, 1999).

TSG-RAN Working Group 1 (Radio) Meeting #3, "A New Hierarchical Correlation Sequence with Good Properties of a Frequency Error", Eskilstuna, Sweden, Mar. 22-26, 1999.

TSG-RAN Working Group 1 Meeting #2, "Synchronization Channel with Cyclic Hierarchical Sequences", Yokohama, Japan, Feb. 22-25, 1999.

TSG-RAN Working Group 1 Meeting #5, "BPSK Modulated Secondary Synchronization Codes Based Cell Search in UTRA TDD", Cheju, South Korea, Jun. 1-4, 1999.

\* cited by examiner

USER EQUIPMENT FOR SYNCHRONIZING TO A TDD BASE STATION

CROSS REFERENCE TO RELATED APPLICATIONS

This application is a continuation of U.S. patent application Ser. No. 11/505,575 filed on Aug. 17, 2006, which is a continuation of U.S. patent application Ser. No. 10/695,276 filed on Oct. 28, 2003, which issued on Sep. 5, 2006 as U.S. Pat. No. 7,102,994, which is a continuation of U.S. patent application Ser. No. 09/576,363, filed May 22, 2000, which issued on Apr. 6, 2004 as U.S. Pat. No. 6,717,930.

BACKGROUND

This invention generally relates to spread spectrum Time Division Duplex (TDD) communication systems using Code Division Multiple Access (CDMA). More particularly, the present invention relates to cell search procedure of User Equipment (UE) within TDD/CDMA communication systems.

FIG. 1 depicts a wireless spread spectrum TDD/CDMA communication system. The system has a plurality of base stations $30_1$ to $30_7$. Each base station $30_1$ has an associated cell $34_1$ to $34_7$ and communicates with user equipments (UEs) $32_1$ to $32_3$ in its cell $34_1$.

In addition to communicating over different frequency spectrums, TDD/CDMA systems carry multiple communications over the same spectrum. The multiple signals are distinguished by their respective code sequences (codes). Also, to more efficiently use the spectrum, TDD/CDMA systems as illustrated in FIG. 2 use repeating frames 38 divided into a number of time slots $36_1$ to $36_n$, such as sixteen time slots 0 to 15. In such systems, a communication is sent in selected time slots $36_1$ to $36_n$ using selected codes. Accordingly, one frame 38 is capable of carrying multiple communications distinguished by both time slot $36_1$ to $36_n$ and code.

For a UE $32_1$ to communicate with a base station $30_1$, time and code synchronization is required. FIG. 3 is a flow chart of the cell search and synchronization process. Initially, the UE $32_1$ must determine which base station $30_1$ to $30_7$ and cell $34_1$ to $34_7$ to communicate. In a TDD/CDMA system, all the base stations $30_1$ to $30_7$ are time synchronized within a base station cluster. For synchronization with UEs $32_1$ to $32_7$, each base station $30_1$ to $30_7$ sends a Primary Synchronization Code (PSC) and several Secondary Synchronization Code (SSC) signals in the time slot dedicated for synchronization. The PSC signal has an associated chip code, such as an unmodulated 256 hierarchical code, and is transmitted in the dedicated time slot, step 46. To illustrate, a base station $30_1$ may transmit in one or two time slots, such as for a system using time slots 0 to 15 in time slot K or slot K+8, where K is either 0, . . . , 7.

One technique used to generate a PSC signal is to use two 16 hierarchical sequences, such as X1 and X2 in Equations 1 and 2.

$$X1=[1, 1, -1, -1, 1, -1, 1, -1, -1, -1, -1, -1, 1, 1, 1, -1] \quad \text{Equation 1}$$

$$X2=[1, 1, -1, -1, -1, -1, 1, -1, 1, 1, -1, 1, 1, 1, -1, 1] \quad \text{Equation 2}$$

Equation 3 illustrates one approach to generate a 256 hierarchal code, y(i), using X1 and X2.

$$y(i)=X1(i \bmod 16) \times X2(i \div 16), \text{ where } i=0, \ldots, 255 \quad \text{Equation 3}$$

Using y(i), the PSC is generated such as by combining y(i) with the first row of length 256 Hadamarad matrix, $h_0$, to produce $C_p(i)$ as in Equation 4.

$$C_p(i)=y(i) \times h_0(i), \text{ where } i=0, \ldots, 255 \quad \text{Equation 4}$$

Since the first row of the Hadamarad matrix is an all one sequence, Equation 4 reduces to Equation 5.

$$C_p(i)=y(i), \text{ where } i=0, \ldots, 255 \quad \text{Equation 5}$$

The $C_p(i)$ is used to produce a spread spectrum PSC signal suitable for transmission.

To prevent the base stations' communications from interfering with each other, each base station $30_1$ to $30_7$ sends its PSC signal with a unique time offset, $t_{offset}$, from the time slot boundary 40. Differing time offsets are shown for time slot 42 in FIG. 4. To illustrate, a first base station $30_1$ has a first time offset $44_1$, $t_{offset,1}$ for the PSC signal, and a second base station $30_2$, has a second time offset $44_2$, $t_{offset,2}$.

To differentiate the different base stations $30_1$ to $30_7$ and cells $34_1$ to $34_7$, each base station $30_1$ to $30_7$ within the cluster is assigned a different group of codes (code group). One approach for assigning a $t_{offset}$ for a base station using an $n^{th}$ code group $44_n$, $t_{offset,n}$ is Equation 6.

$$t_{offset,n}=n \approx 71 T_c \quad \text{Equation 6}$$

$T_c$ is the chip duration and each slot has a duration of 2560 chips. As a result, the offset $42_n$ for each sequential code group is spaced 71 chips.

Since initially the UE $32_1$ and the base stations $30_1$ to $30_7$ are not time synchronized, the UE $32_1$ searches through every chip in the frame 38 for PSC signals. To accomplish this search, received signals are inputted to a matched filter which is matched to the PSC signal's chip code. The PSC matched filter is used to search through all the chips of a frame to identify the PSC signal of the base station $30_1$ having the strongest signal. This process is referred to as step-1 of cell search procedure.

After the UE $32_1$ identifies the PSC signal of the strongest base station $30_1$, the UE $32_1$ needs to determine the time slot $36_1$ to $36_n$ in which that PSC and SSC signals are transmitted (referred to as the Physical Synchronization Channel (PSCH) time slot) and the code group used by the identified base station $30_1$. This process is referred to as step-2 of cell search procedure. To indicate the code group assigned to the base station $30_1$ and the PSCH time slot index, the base station $30_1$ transmits signals having selected secondary synchronization codes (SSCs), step 48. The UE $32_1$ receives these SSC signals, step 50, and identifies the base station's code group and PSCH time slot index based on which SSCs were received, step 52.

For a TDD system using 32 code groups and two possible PSCH time slots per frame, such as time slots K and K+8, one approach to identify the code group and PSCH time slot index is to send a signal having one of 64 SSCs. Each of the synchronization codes corresponds to one of the 32 code groups and two possible PSCH time slots. This approach adds complexity at the UE $32_1$ requiring at least 64 matched filters and extensive processing. To identify the code group and PSCH time slot index, 17,344 real additions and 128 real multiplications are required in each PSCH time slot and 64 real additions are required for the decision.

An alternative approach for step-2 of cell search procedure uses 17 SSCs. These 17 SSCs are used to index the 32 code groups and two possible PSCH time slots per frame. To implement this approach, at least 17 matched filters are required. To identify the code group and time slot, 1,361 real additions and 34 real multiplications are required for each PSCH time slot. Additionally, 512 real additions are required for the decision.

It would be desirable to reduce the complexity required by a UE $32_1$ to perform cell search procedure.

SUMMARY

A time division duplex (TDD) user equipment (UE) is configured to synchronize to a TDD base station. The UE includes an antenna, a primary synchronization code matched filter, a first plurality of secondary synchronization code matched filters, a second plurality of secondary synchronization code matched filters, and a processor in communication with the first and second plurality of secondary synchronization code matched filters. The first plurality of secondary synchronization code matched filters determines secondary synchronization codes sent on a first carrier and the second plurality of secondary synchronization code matched filters determines secondary synchronization codes sent on a second carrier. The processor is configured to determine a code group assignment and selected timeslot based upon an analysis of the secondary synchronization codes sent on the first and second carriers.

DETAILED DESCRIPTION OF THE PREFERRED EMBODIMENTS

Figure 5:
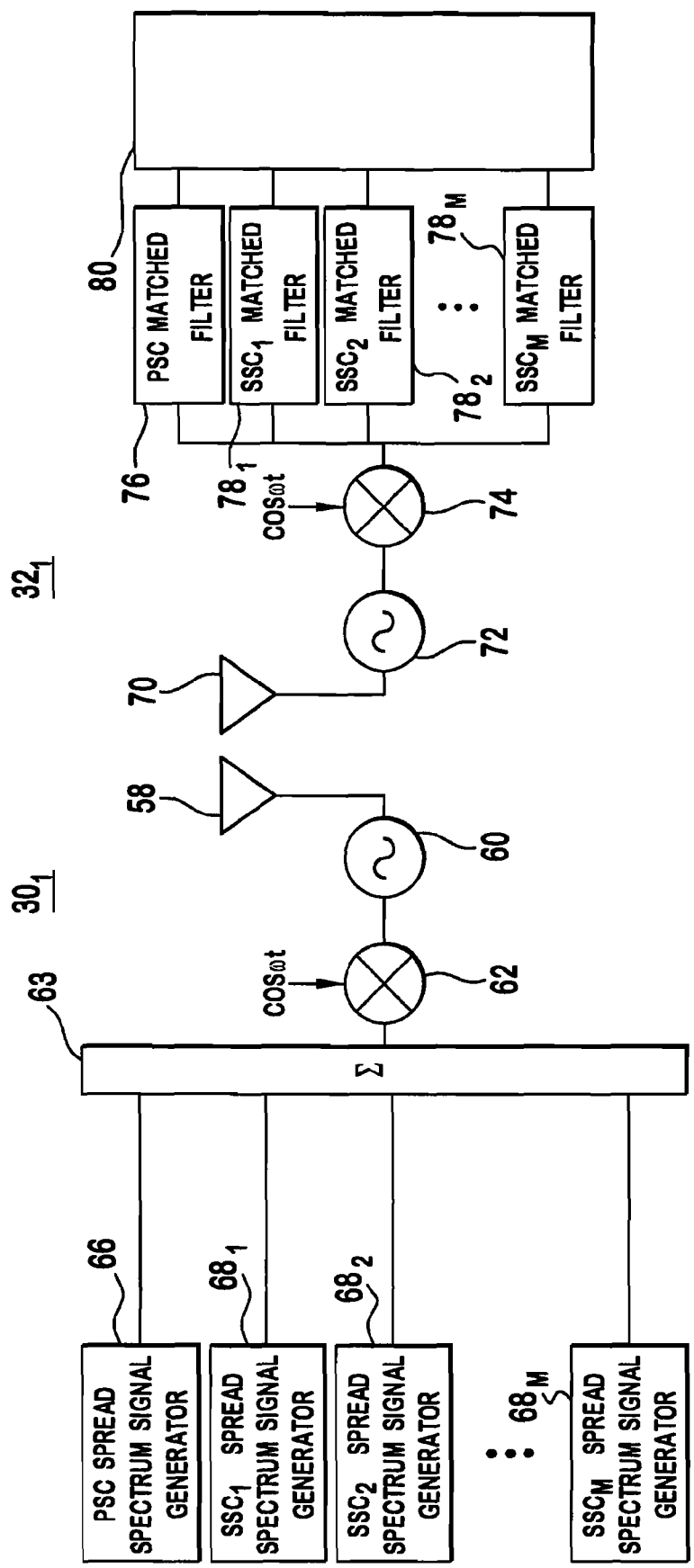
FIG. 5 is a diagram of the simplified components of a user equipment and a base station using binary phase shift keying modulation for cell search.

The preferred embodiments will be described with reference to the drawing figures where like numerals represent like elements throughout. FIG. 5 shows the simplified circuitry of a base station $30_1$ and a UE $32_1$ for use in cell search. During step-1 of the cell search, the base station $30_1$ generates a PSC signal using a PSC spread spectrum signal generator 66 having the time offset in the time slot 42 associated with the base station $30_1$. The PSC signal is combined by a combiner 63 with M SSC signals. The combined signal is modulated by a modulator 62 to carrier frequency. The modulated signal passes through an isolator 60 and is radiated by an antenna 58 or, alternately, an antenna array. The UE $32_1$ receives signals using an antenna 70 or, alternatively, an antenna array. The received signals are passed through an isolator 72 where they are demodulated by a demodulator 74 to baseband frequency.

During step-1 of the cell search, the PSC matched filter 76 is used by the processor 80 to search through all the chips of a frame 38 to identify the PSC signal of the base station $30_1$ having the strongest signal.

One approach for detection of a PSC signal location in a frame is as follows. A selected number of positions in the received signal frame, such as forty, having the highest number of accumulated chip matches (i.e. maximum signal strength), are repeatedly correlated at the same positions in subsequent frames 38. Out of the selected locations, the one having the highest number of cumulative matches (i.e. the maximum signal strength) is identified as the location of the PSC signal.

For step-2 of the cell search procedure, the base station $30_1$ generates SSC signals, $SSC_1$ to $SSC_M$, using SSC spread spectrum signal generators $68_1$ to $68_M$. To reduce the complexity at the UE $32_1$, a reduced number of SSCs are used. By reducing the SSCs, the number of matched filters required at the UE $32_1$ is reduced. Additionally, the reduced SSCs decreases the processing resources required to distinguish the different codes. The reduced SSCs also reduces the probability of incorrect detection of a code group number and PSCH time slot index (see FIGS. 9-15).

Figure 1:
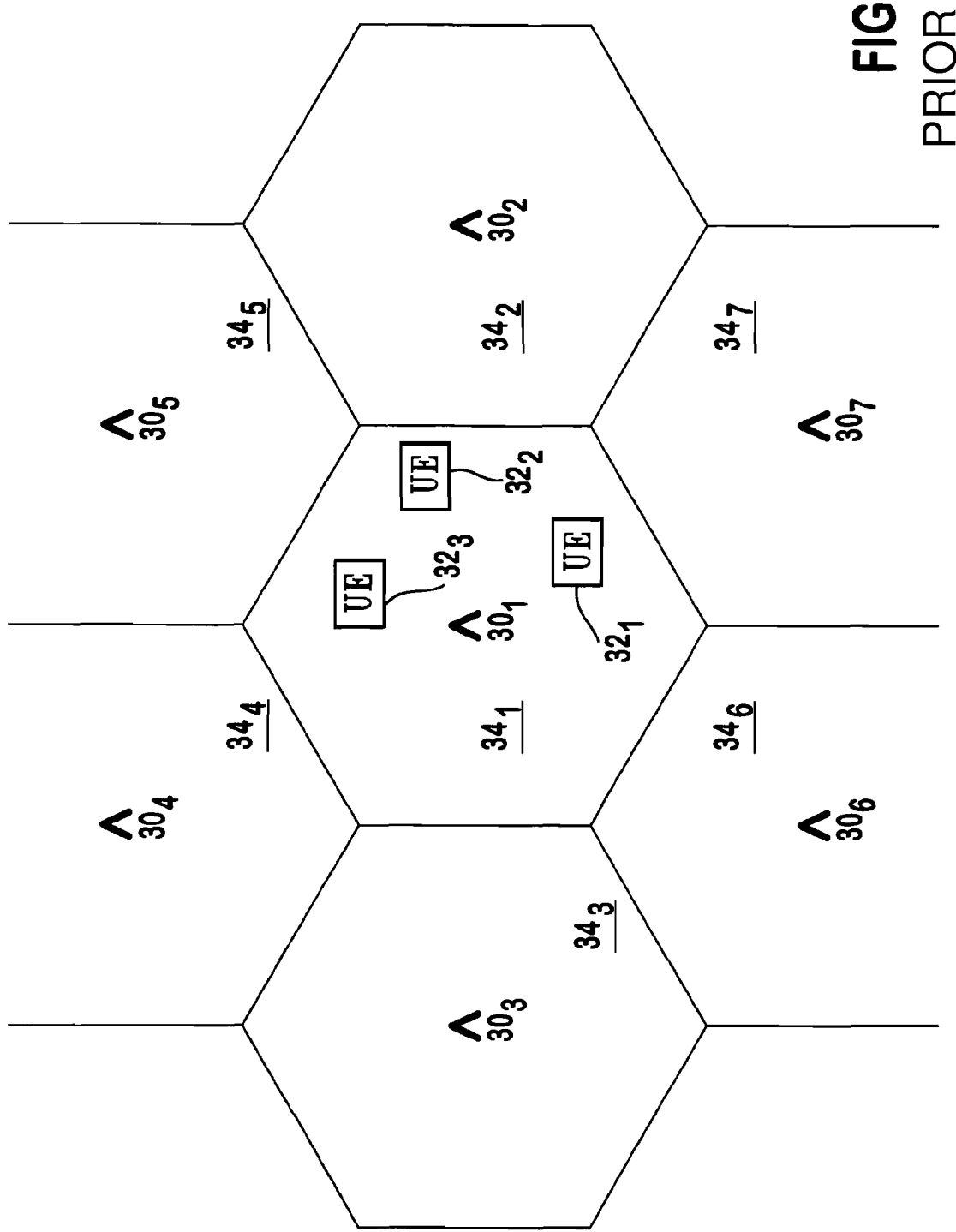
FIG. 1 illustrates a prior art TDD/CDMA system.
Figure 2:
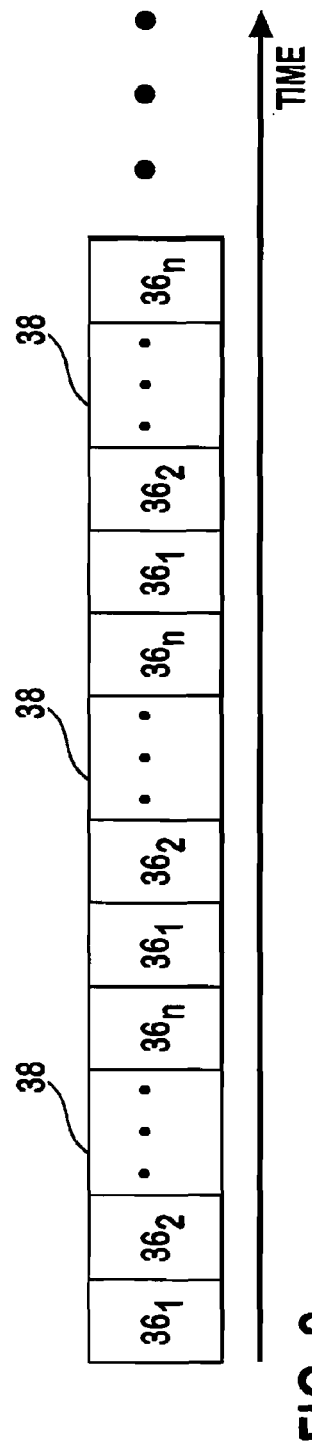
FIG. 2 illustrates time slots in repeating frames of a TDD/CDMA system.
Figure 4:
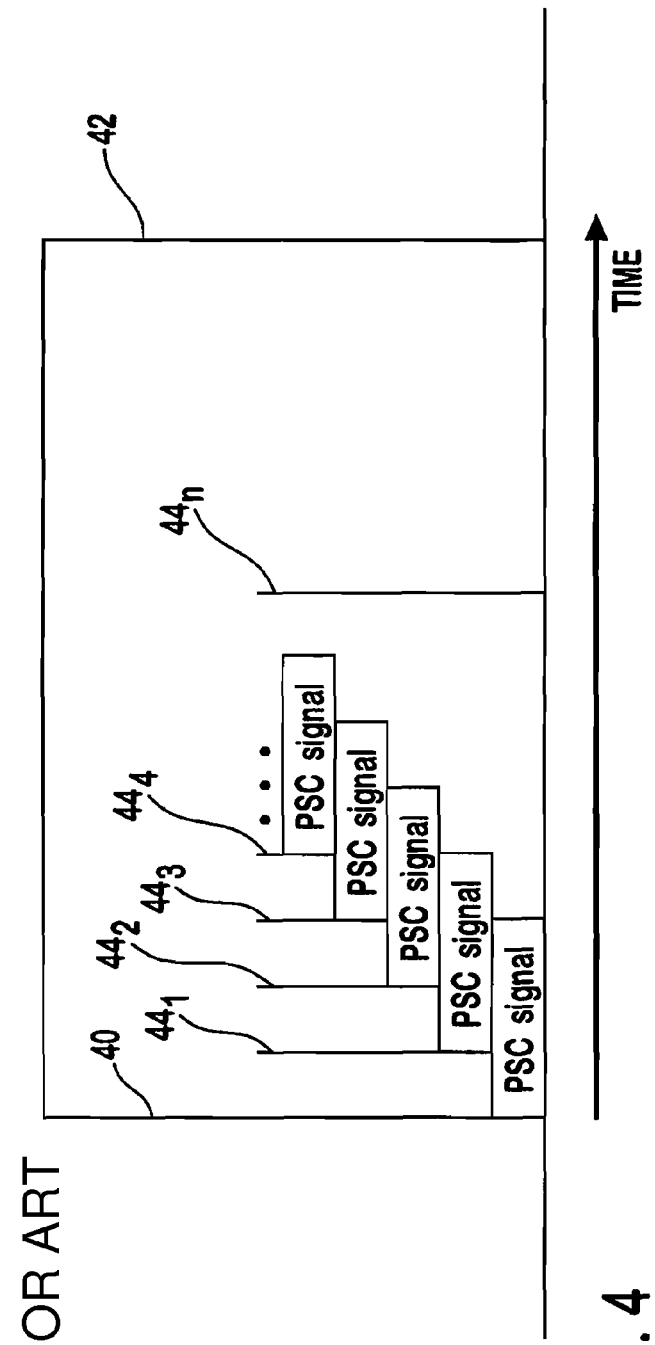
FIG. 4 illustrates time offsets used by differing base stations sending primary synchronization code signals.
Figure 3:
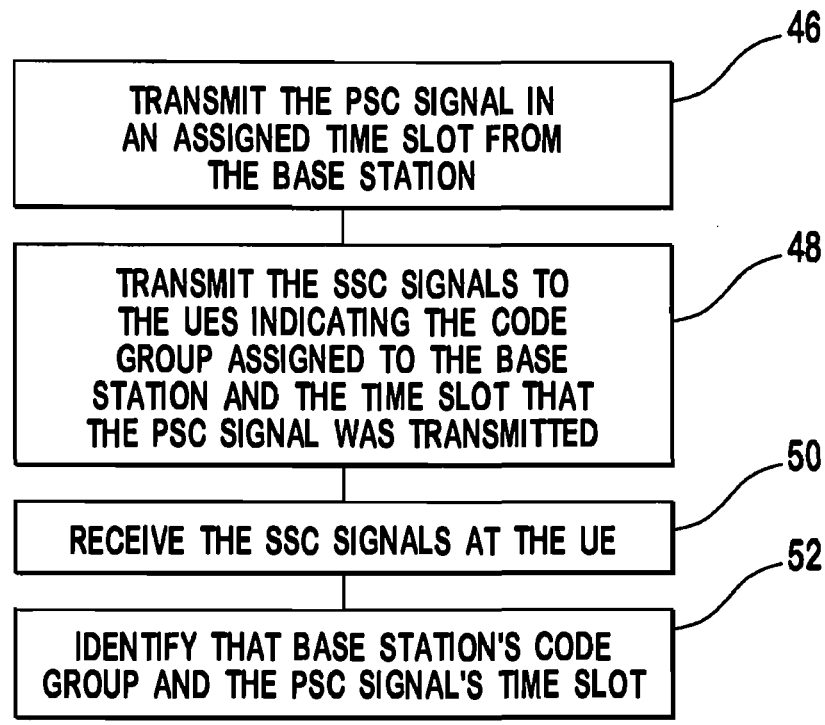
FIG. 3 is a flow chart of cell search.
Figure 6:
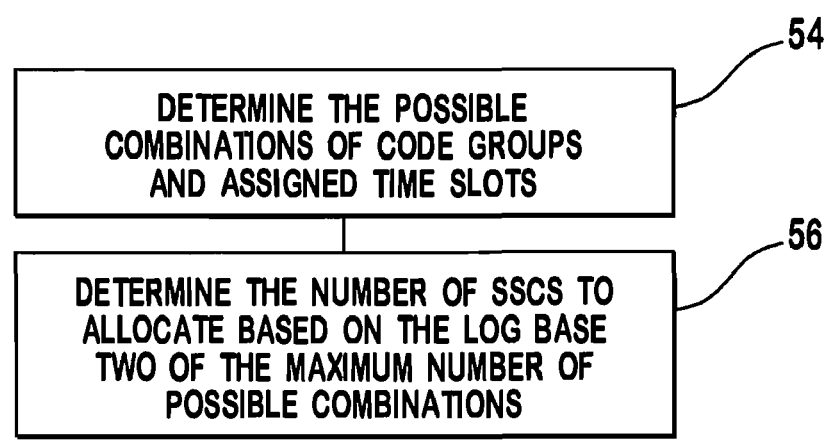
FIG. 6 is a flow chart of secondary synchronization code assignment.

One approach to reduce the SSCs is shown in the flow chart of FIG. 6. The number of SSCs used, M, is based on the number of code groups and PSCH time slots used per frame, step 54. The number of SSCs, M, is the log base two of the maximum combination number rounded up to the next higher integer, step 56, as in Equation 7.

$M = \log_2(\text{\# of Code Groups} \times \text{\# of PSCH Time Slots per frame})$      Equation 7

The base station $30_1$ generates, using SSC signal generators $68_1$ to $68_M$, the SSC signals associated with the base station's code group and the number of PSCH time slots per frame. The SSC signals are combined with each other as well as the PSC signal by combiner 63. Subsequently, the combined signal is modulated by the modulator 62, passed through the isolator 60 and radiated by the antenna 58. The UE $32_1$ receives the transmitted signal, passes it through the isolator 72 and demodulates the received signal using the demodulator 74. Using corresponding $SSC_1$ to $SSC_M$ matched filters $78_1$ to $78_M$, the processor 80 determines the binary code that SSCs are modulated. Based on the determined binary code, the base station's code group and PSCH time slot index in the frame is determined. To illustrate for a system using 32 code groups and two possible time slots per frame, such as slots K and K+8, the number of binary bits needed to modulate SSCs, M, is six ($\log_2 64$). In such a system, the six SSCs are modulated with six bits using binary phase shift keying (BPSK) modulation. The six SSCs are chosen among the 256 rows of Hadamarak matrix, $H_8$. The Hadamarak matrix is generated sequentially, such as by Equations 8 and 9.

$H_0 = (1)$      Equation 8

$H_t = \begin{bmatrix} H_{t-1} & H_{t-1} \\ H_{t-1} & H_{t-1} \end{bmatrix}$, $t = 1, \ldots, 8$      Equation 9

A particular code, $C_{k,n}(i)$, where n is the code group number associated with a SSC is produced using Equation 10. The six rows of Hadamarak matrix, $H_8$, are $r(k) = [24, 40, 56, 104, 120, 136]$.

$C_{k,n}(i) = b_{k,n} \times h_r(k)(i) \times y(i)$, where $i = 0, 1, \ldots, 255$ and $k = 1, \ldots, 6$      Equation 10

The value of $b_2$ to $b_6$ are depicted in Table 1.

TABLE 1

| Code Group (n) | $b_{6,n}$ | $b_{5,n}$ | $b_{4,n}$ | $b_{3,n}$ | $b_{2,n}$ |
|---|---|---|---|---|---|
| 1 | +1 | +1 | +1 | +1 | +1 |
| 2 | +1 | +1 | +1 | +1 | −1 |
| 3 | +1 | +1 | +1 | −1 | +1 |
| ... | ... | ... | ... | ... | ... |
| 32 | −1 | −1 | −1 | −1 | −1 |

The value of $b_{1,n}$ is depicted in Table 2.

TABLE 2

| PSCH time slot order in the frame | $b_{1,n}$ |
|---|---|
| K, where K = 0, . . . , 7 | +1 |
| K + 8 | −1 |

Each code corresponds to one SSC, $SSC_1$ to $SSC_6$. To distinguish the differing base stations' SSC signals from one another, each of the base stations' SSC signals has the same offset as its PSC signal. At the UE $32_1$, the step-2 of the cell search procedure (i.e. code group number and PSCH slot order detection) is performed as follows. The received baseband signal is first correlated with $C_p$ as per Equation 4 to obtain phase reference. This correlation is performed by PSC matched filter 76 in FIG. 5. The phase reference is obtained by normalizing the correlation value obtained at the output of the PSC matched filter 76. The received baseband signal is also correlated with C1, . . . , C6 as per Equation 10 to obtain binary data that represent the code group of the base station $30_1$ and PSCH slot order in the frame. This correlation is performed by SSC matched filters $78_1$-$78_M$ in FIG. 5. These matched filter outputs are derotated before BPSK demodulation. The derotation is performed by complex multiplication of the complex conjugate of the phase reference. The derotated SSC matched filter outputs are BPSK demodulated. The BPSK demodulation is performed by a hard limiter on the real part of the derotated SSC matched filter outputs. As a result, if the real part of the derotated SSC matched filter output is greater than zero, it is demodulated as +1. Otherwise, it is demodulated as −1. The demodulated binary data represents the code group of the base station $30_1$ and the PSCH time slot order in the frame as depicted in Table 1 and Table 2, respectively. To ease detection of the six SSCs, the UE $32_1$ accumulates the derotated outputs of the SSC matched filters $78_1$-$78_M$ over a number of the PSCH time slots, such as four or eight.

Using six SSCs, for 32 code groups and two possible PSCH time slots, requires 653 real additions and 28 real multiplications at the UE $32_1$ to identify the code group/PSCH time slot index. For the decision, no additions or multiplications are required. Accordingly, reducing the number of transmitted SSCs in the PSCH time slot reduces the processing at the UE $32_1$.

Alternately, to reduce the number of SSCs even further quadrature phase shift keying (QPSK) modulation is used. To reduce the SSC number, each SSC signal is sent on either an In-phase (I) or Quadrature (Q) component of the PSCH. One extra bit of data associated with either using the I or Q carrier is used to distinguish the code group/PSCH time slots. As a result, the number of SSCs, M, required by Equation 6 is reduced by one.

For instance, to distinguish 32 code groups and two possible PSCH time slots, five SSCs (M=5) are required. The code groups are divided in half (code groups 1-16 and code groups 17-32). When the SSCs are transmitted on the I carrier, it restricts the code groups to the lower half (code groups 1-16) and when the SSCs are transmitted on the Q carrier, it restricts the code groups to the upper half (code groups 17-32). The five SSCs distinguish between the remaining sixteen possible code groups and two possible PSCH time slots.

Figure 7:
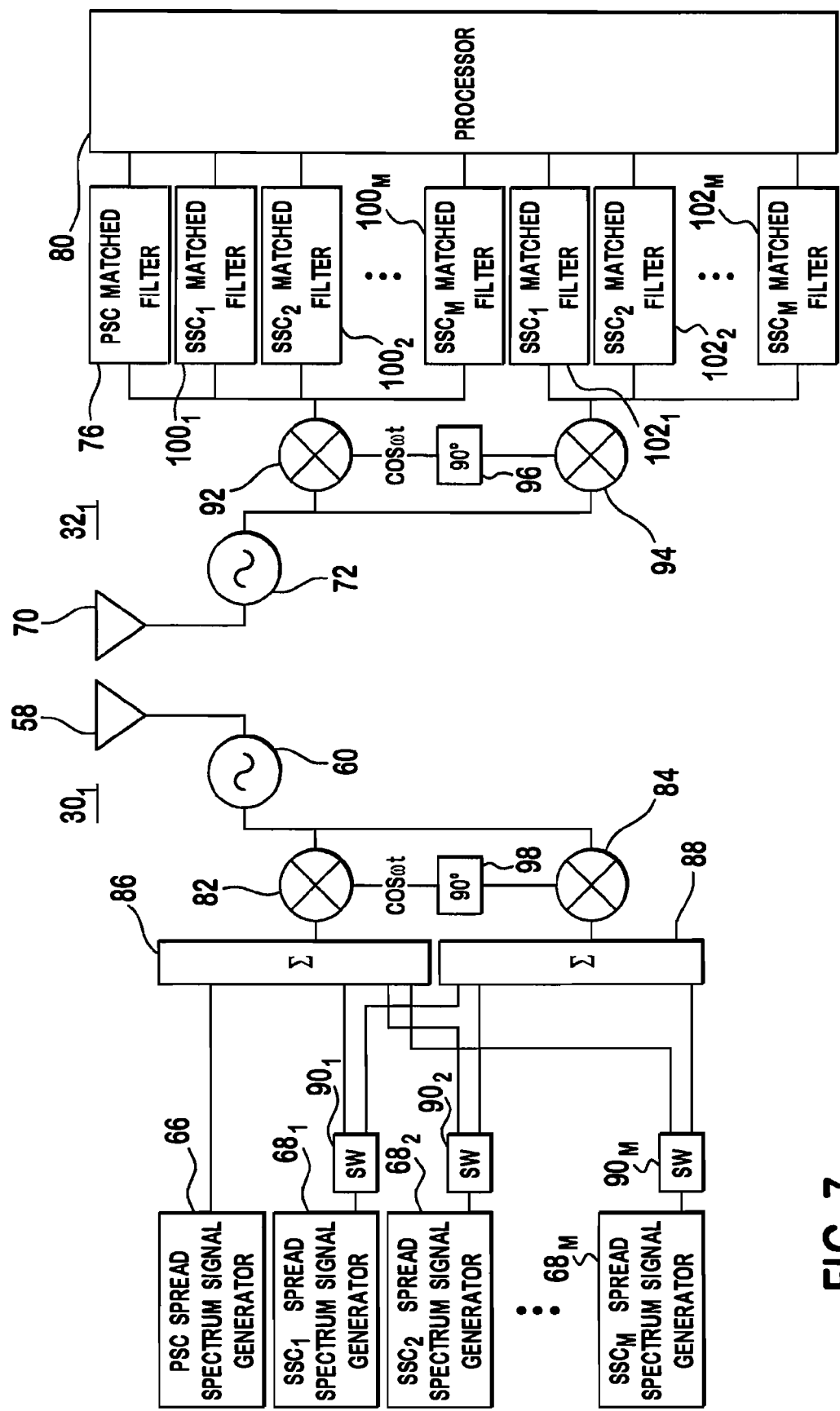
FIG. 7 illustrates the simplified components of a user equipment and a base station using quadrature phase shift keying modulation for cell search.

A simplified base station $30_1$ and UE $32_1$ using QPSK modulation are shown in FIG. 7. The base station $30_1$ generates the appropriate SSC signals for its code group and PSCH time slot using the SSC spread spectrum signal generators $68_1$ to $68_M$. Also based on the base station's code group/PSCH time slot index, switches $90_1$ to $90_M$ either switch the outputs of the generators $68_1$ to $68_M$ to an I combiner 86 or a Q combiner 88. The combined I signal which includes the PSC signal is modulated by an I modulator 82 prior to transmission. The combined Q signal is modulated by a Q modulator 84 prior to transmission. One approach to produce the Q carrier for modulating the signal is to delay the I carrier by ninety degrees by a delay device 98. The UE $32_1$ demodulates the received signals with both an I demodulator 92 and a Q demodulator 94. Similar to the base station $30_1$, the UE $32_1$ may produce a Q carrier for demodulation using a delay device 96. Obtaining binary data representing the lower or higher half of the 16 code groups and PSCH time slot index is the same as applying BPSK demodulation on the I and Q components of the received signal respectively. The I matched filters $100_1$ to $100_M$ are used by the processor 80 to determine whether any SSC signals were sent on the I component of the PSCH. A decision variable, $I_{dvar}$, is obtained such as by using Equation 11.

$$I_{dvar} = |rx_1| + |rx_2| + \ldots + |rx_m| \quad \text{Equation 11}$$

$|rx_i|$ is the magnitude of the real component (I component) of the $i^{th}$ SSC matched filter output. Likewise, the Q matched filters $102_1$ to $102_M$ are used by the processor 80 to determine whether any SSC signals were sent on the Q component of the PSCH. A decision variable, $Q_{dvar}$, is obtained such as by using Equation 12.

$$Q_{dvar} = |ix_1| + |ix_2| + \ldots + |ix_M| \quad \text{Equation 12}$$

$|ix_i|$ is the magnitude of the imaginary (Q component) of the $i^{th}$ SSC matched filter outputs.

If $I_{dvar}$ is greater than $Q_{dvar}$, the SSC signals were transmitted on the I component. Otherwise, the SSC signals were transmitted on the Q component.

Figure 8:
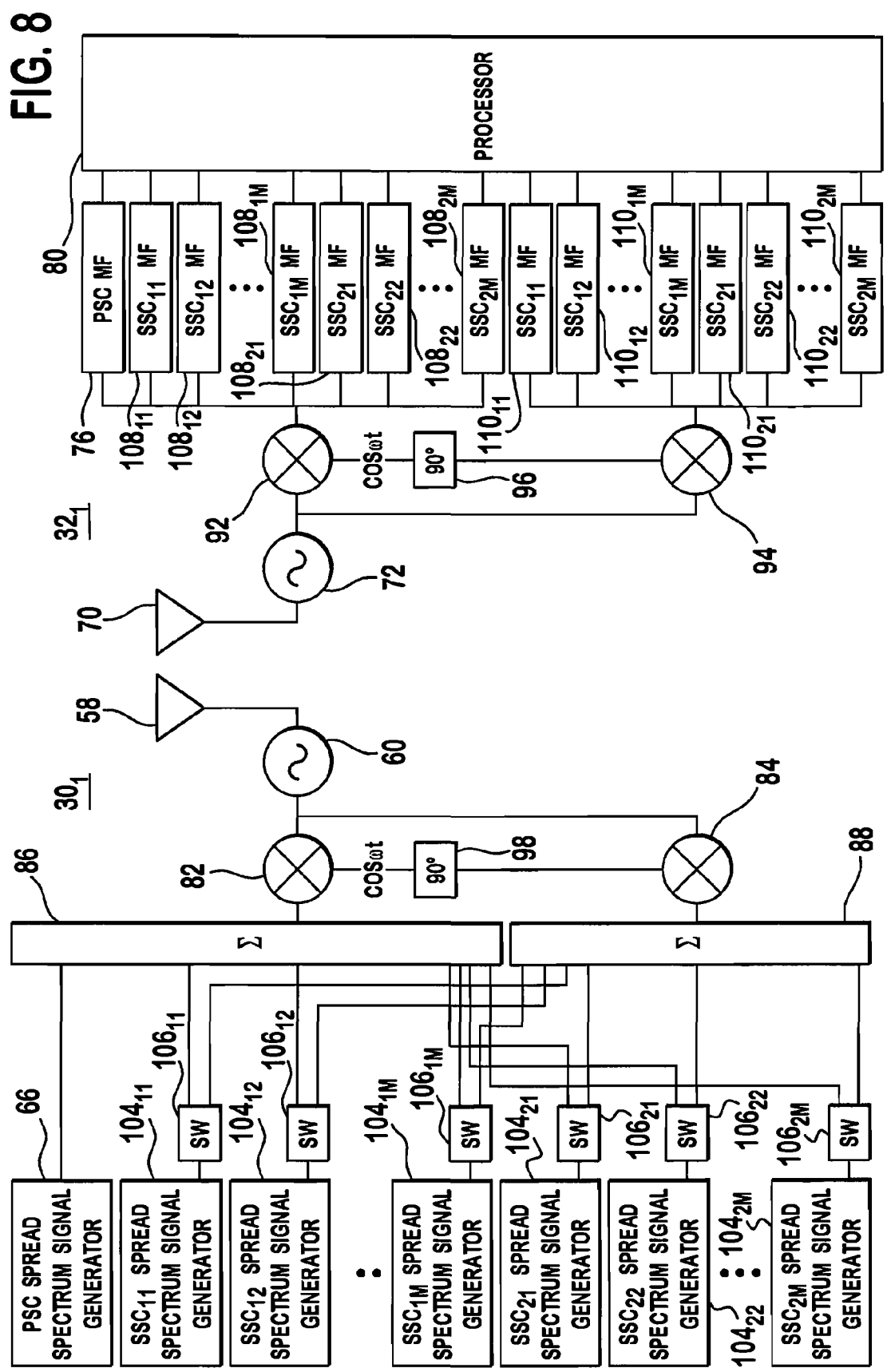
FIG. 8 illustrates the simplified components of a user equipment and a base station reducing the maximum number of transmitted secondary synchronization codes using quadrature phase shift keying modulation.

Another approach using QPSK modulation to reduce the number of SSC signals transmitted is depicted in FIG. 8. Instead of transmitting the number of SSCs of FIG. 7, the number of SSCs, M, representing the code group number and PSCH time slot index is reduced by one. To regain the one lost bit of information by reducing the SSCs, two sets of M SSCs are used. For instance using 32 code groups and two possible PSCH time slots, one set, $SSC_{11}$ to $SSC_{14}$, is assigned to the lower code groups, such as code groups 1 to 16, and the second set, $SSC_{21}$ to $SSC_{24}$, is assigned to the upper code groups, such as code groups 17 to 32. For the lower code group, sending $SSC_{11}$ to $SSC_{14}$ on the I carrier restricts the code groups to 1 to 8. The Q carrier restricts the code groups to 9 to 16. Likewise, for the upper code group, in phase $SSC_{21}$ to $SSC_{24}$ restricts the code groups to 17 to 24 and Q $SSC_{21}$ to $SSC_{24}$ restricts the code groups to 25 to 32. As a result, the maximum number of SSCs transmitted at one time is reduced by one. By reducing the number of SSCs, the interference between SSC signals is reduced. Reduced interference between SSCs allows higher transmission power levels for each SSC signal easing detection at the UE $32_1$.

A simplified base station $30_1$ and UE $32_1$ implementing the reduced SSC approach is shown in FIG. 8. At the base station $30_1$, two sets of M SSC spread spectrum signal generators $104_{11}$ to $104_{2M}$ generate the SSC signals corresponding to the base station's code group and PSC time slot. The corresponding SSC signals are switched using switches $106_{11}$ to $106_{2M}$ to either an I 82 or Q modulator 84 as appropriate for that base station's code group and PSCH time slot. At the UE $32_1$, an I set of matched filters $108_{11}$ to $108_{2Q}$ is used to determine if any of the SSCs were sent on the I carrier. A Q set of matched filters $110_{11}$ to $110_{2M}$ is used to determine if any of the SSCs were sent on the Q carrier. By detecting the transmitted I and Q SSCs, the processor 80 determines the base station's code group and PSCH time slot.

One approach to determining which of 32 code groups and two possible PSCH time slots is used by the base station $32_1$ follows. After the processor 80 accumulates data from matched filters $110_{11}$ to $110_{24}$, the code group set, either $SSC_{11}$ to $SSC_{14}$ or $SSC_{21}$ to $SSC_{24}$, is determined using Equations 13 and 14.

$$\text{var\_set } 1 = |rx_{11}| + |ix_{12}| + \ldots + |rx_{14}| + |ix_{14}| \quad \text{Equation 13}$$

$$\text{var\_set } 2 = |rx_{21}| + |ix_{22}| + \ldots + |rx_{24}| + |ix_{24}| \quad \text{Equation 14}$$

The values, $rx_{11}$ to $rx_{24}$, are the number of accumulated matches for a respective SSC, $SSC_{11}$ to $SSC_{24}$, received in the I channel. Similarly, $ix_{11}$ to $ix_{24}$ are the number of accumulated matches for the Q channel for $SSC_{11}$ to $SSC_{24}$. Equations 13 and 14 require a total of 16 real additions. var_set 1 represents the total accumulations of the first SSC set, $SSC_{11}$ to $SSC_{14}$. var_set 2 represents the total accumulations of the second SSC set, $SSC_{21}$ to $SSC_{24}$. The processor 80 compares var_set 1 to var_set 2 and the larger of the two variables is presumed to be the SSC set transmitted by the base station $32_1$.

To determine whether the SSCs were transmitted on the I or Q channel, Equations 15 and 16 are used.

$$\text{var\_I} = |rx_{p1}| + \ldots + |rx_{p4}| \quad \text{Equation 15}$$

$$\text{var\_Q} = |ix_{p1}| + \ldots + |ix_{p4}| \quad \text{Equation 16}$$

If var_set 1 is selected as being larger than var_set 2, the value of p is one. Conversely, if var_set 2 is larger, the value of p is two. var_I is the accumulated values for the selected set on the I carrier and var_Q is the accumulated values on the Q carrier. The larger of the two variables, var_I and var_Q, is presumed to be the channel that the selected set was transmitted over. By ordering the additions in Equations 13 and 14, the values of var_I and var_Q can be determined simultaneously with var_set 1 and var_set 2. Accordingly, determining whether the I or Q carrier was used requires no additional additions. As a result, using QPSK modulation and two SSC sets requires 803 real additions and 36 real multiplications in each time slot and 16 real additions for the decision.

FIGS. 9 to 15 are graphs illustrating the performance for distinguishing 32 code groups/two PSCH time slots of systems using 32 SSCs 128, 17 SSCs 124 and 6 SSCs 126. The graphs show the performance for various simulated channel conditions. The simulations accumulated the SSC matches at the UE $32_1$ over four or eight PSCH time slots and compared the probability of an incorrect synchronization to the channel's signal to noise ratio (SNR) in decibels.

Figure 9:
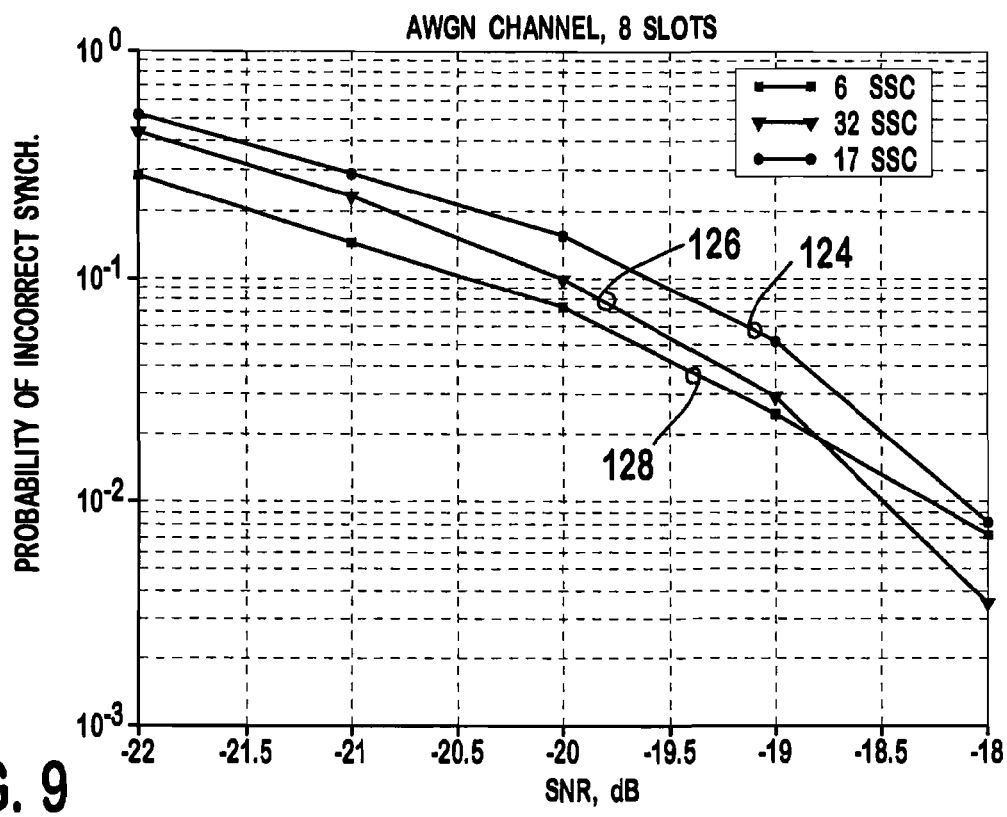
FIGS. 9 to 17 are graphs depicting the performance of various synchronization systems under varying simulated channel conditions.
Figure 10:
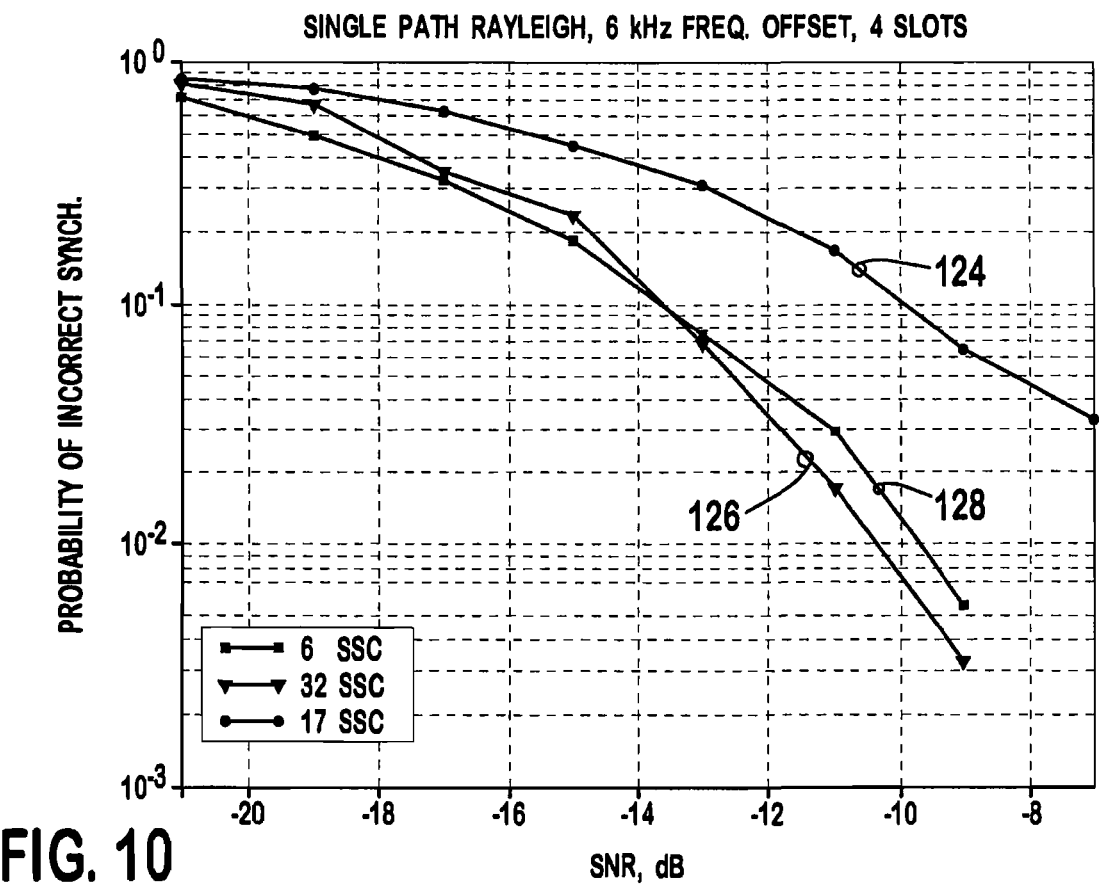
Figure 11:
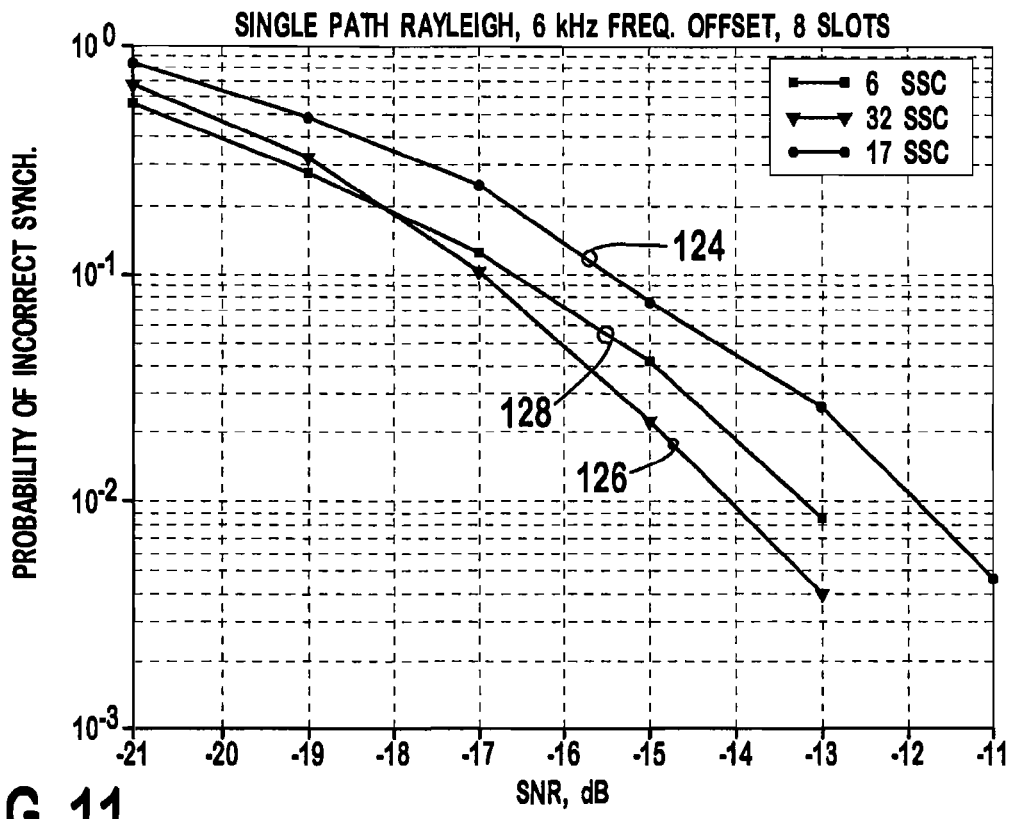
Figure 12:
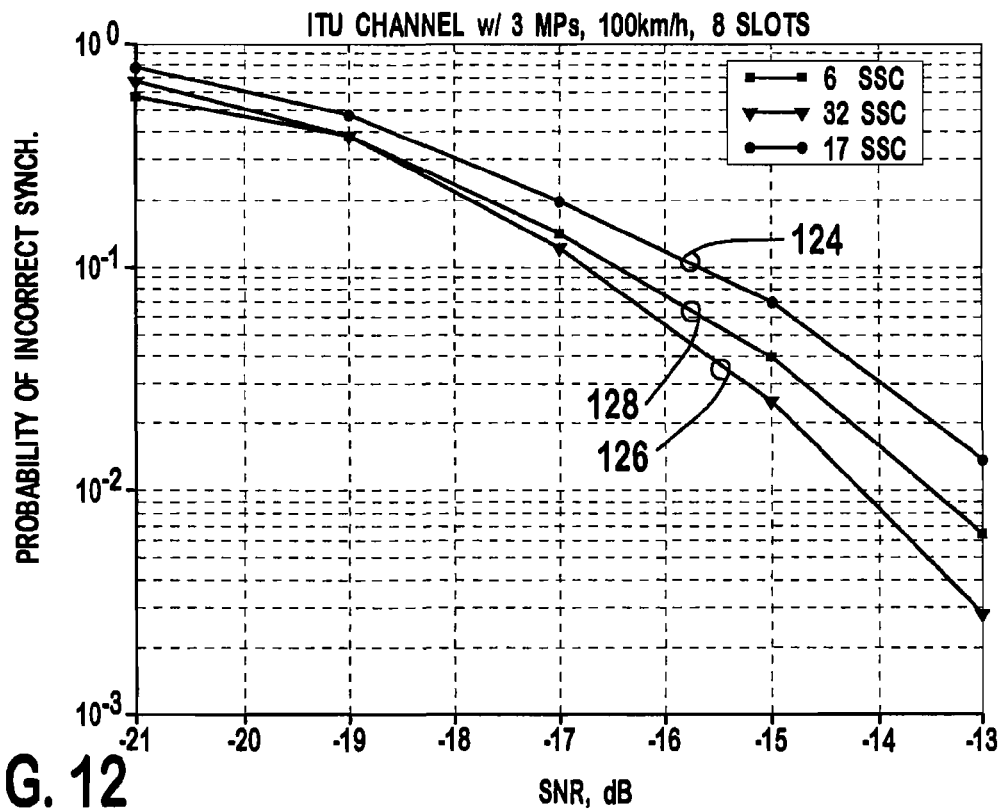
Figure 13:
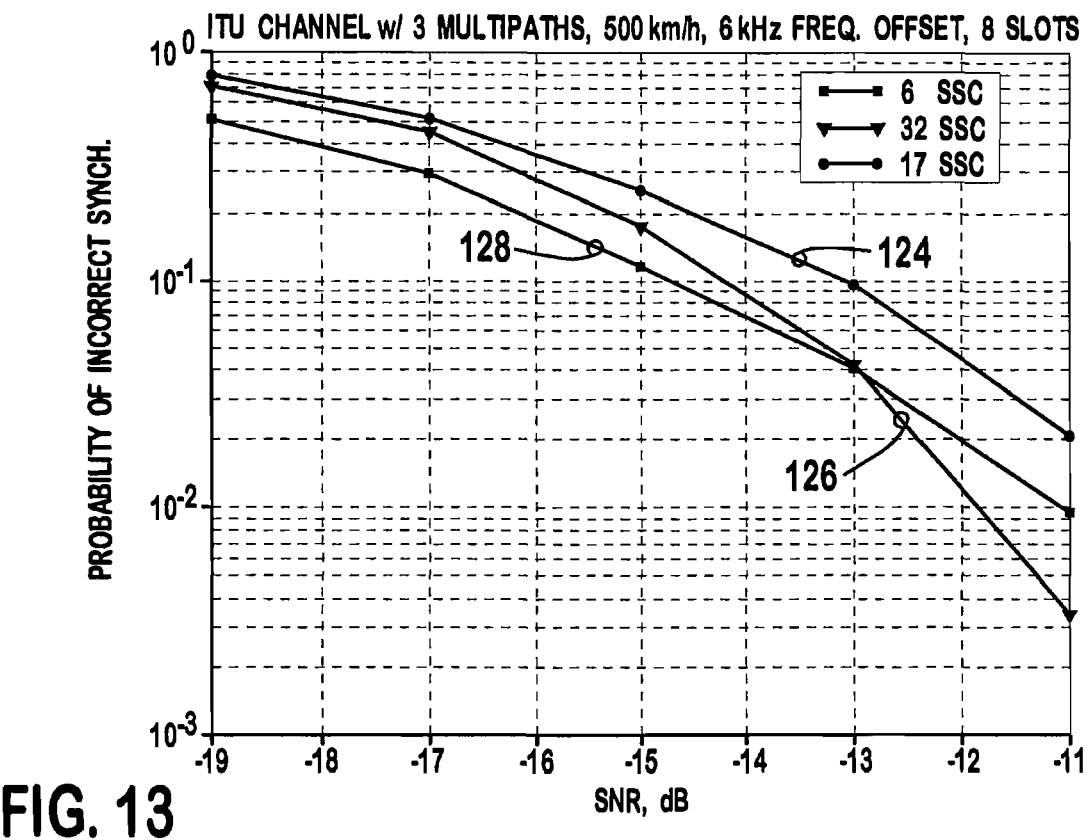

The FIG. 9 simulation uses an additive white gaussian noise (AWGN) channel and accumulation over eight PSCH time slots. The FIG. 10 simulation uses a single path Rayleigh fading channel with a six kilohertz (kHz) frequency offset and accumulation over four PSCH time slots. The FIG. 11 simulation is the same as the FIG. 10 simulation except the accumulation was over eight PSCH time slots. The FIG. 12 simulation uses an ITU channel with three multipaths with a UE $32_1$ moving at 100 kilometers per hour (km/h) and accumulation over eight PSCH time slots. The FIG. 13 simulation uses an ITU channel with three multipaths having six kilohertz (kHz) frequency offset and a UE $32_1$ moving at 500 km/h with accumulation over eight PSCH time slots. The FIG. 14 simulation uses a single path Rayleigh channel having 10 kHz frequency offset with accumulation over eight PSCH time slots. The FIG. 15 simulation uses an ITU channel with three multipaths having 10 kHz frequency offset and the UE $32_1$ moving at 500 km/h with accumulation over eight PSCH time slots.

Figure 14:
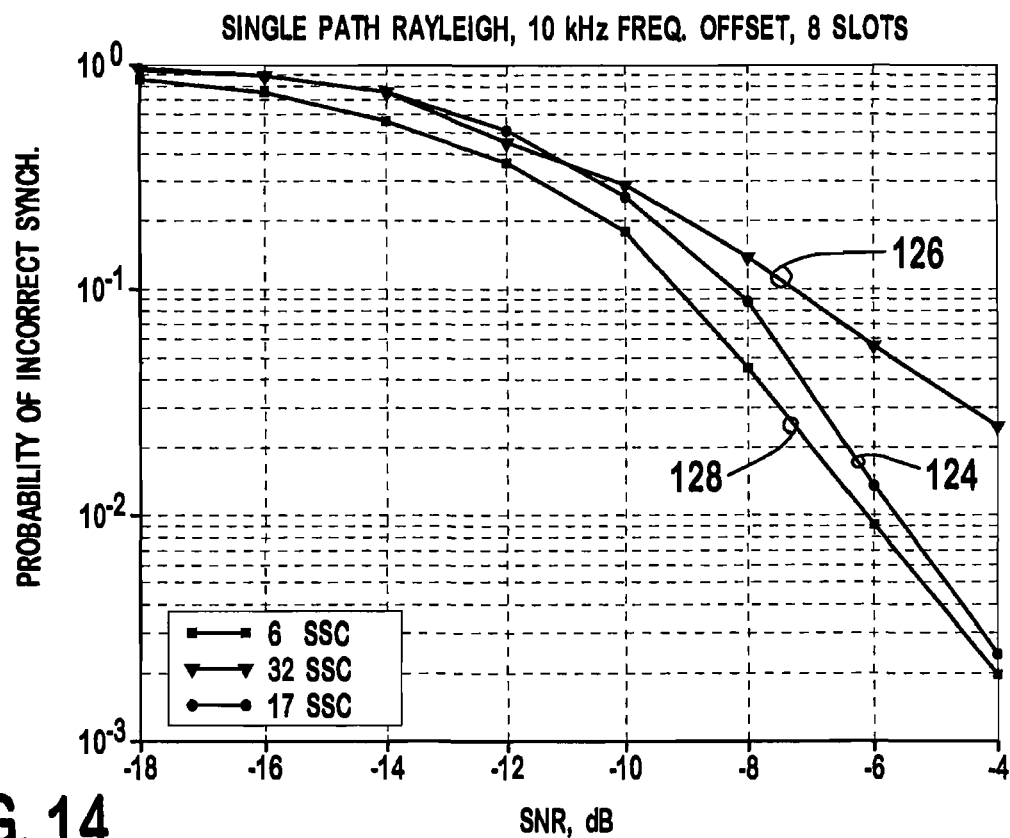
Figure 15:
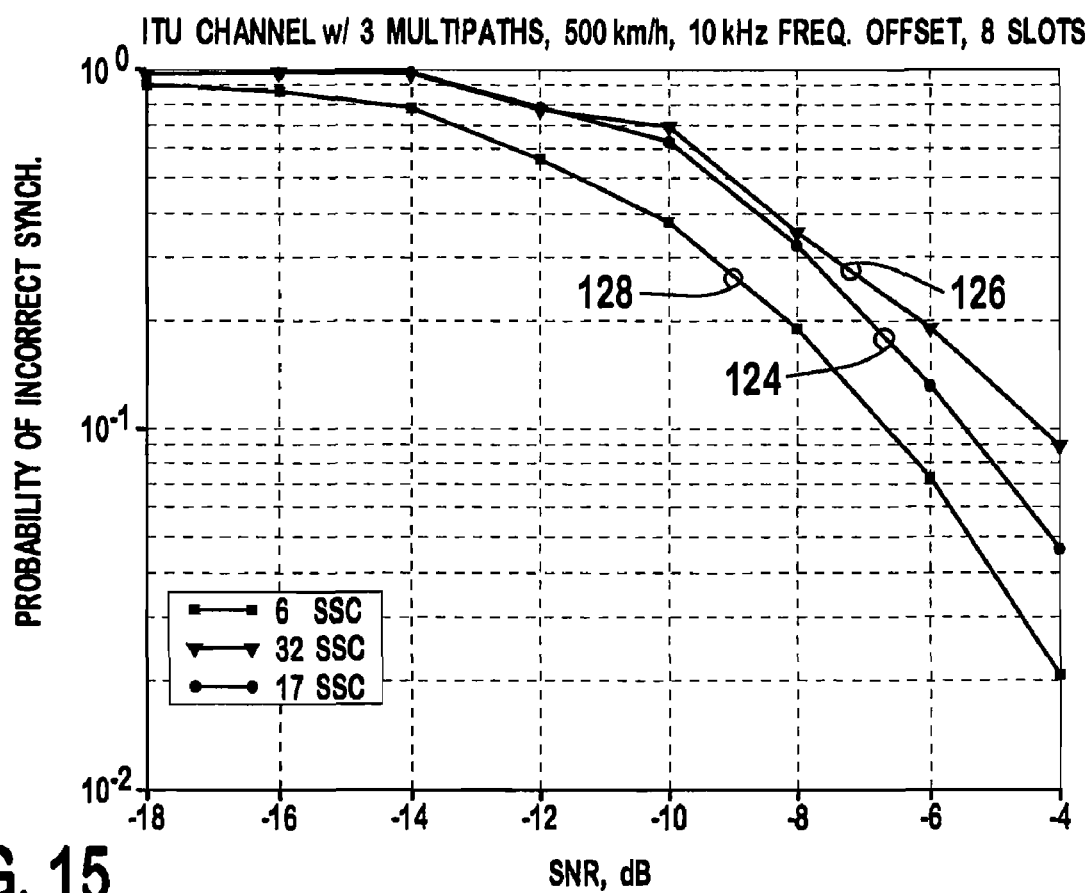

Under the simulated conditions of FIGS. 14 and 15, 6 SSCs 128 outperforms the other techniques 124, 126. As shown in FIGS. 9 to 13, 6 SSCs 128 performs favorably in comparison to the other techniques 124, 126.

Figure 16:
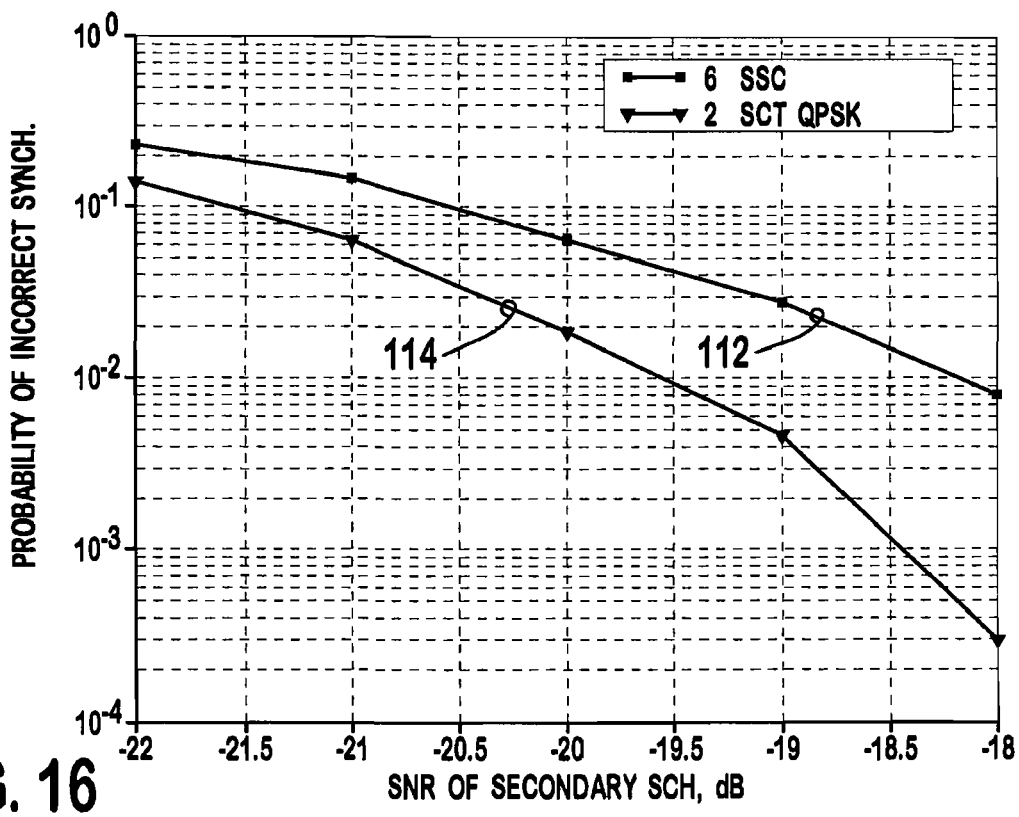

FIG. 16 is a graph of the simulated performance of 6 SSCs 114 using BPSK and the two sets of 4 SSCs 112 using QPSK modulation. The simulation used an eight PSCH time slot accumulation of the matches for each SSC and transmission over an AWGN channel. As shown, two set QPSK modulation 112 outperformed 6 SSC BPSK modulation 114.

Figure 17:
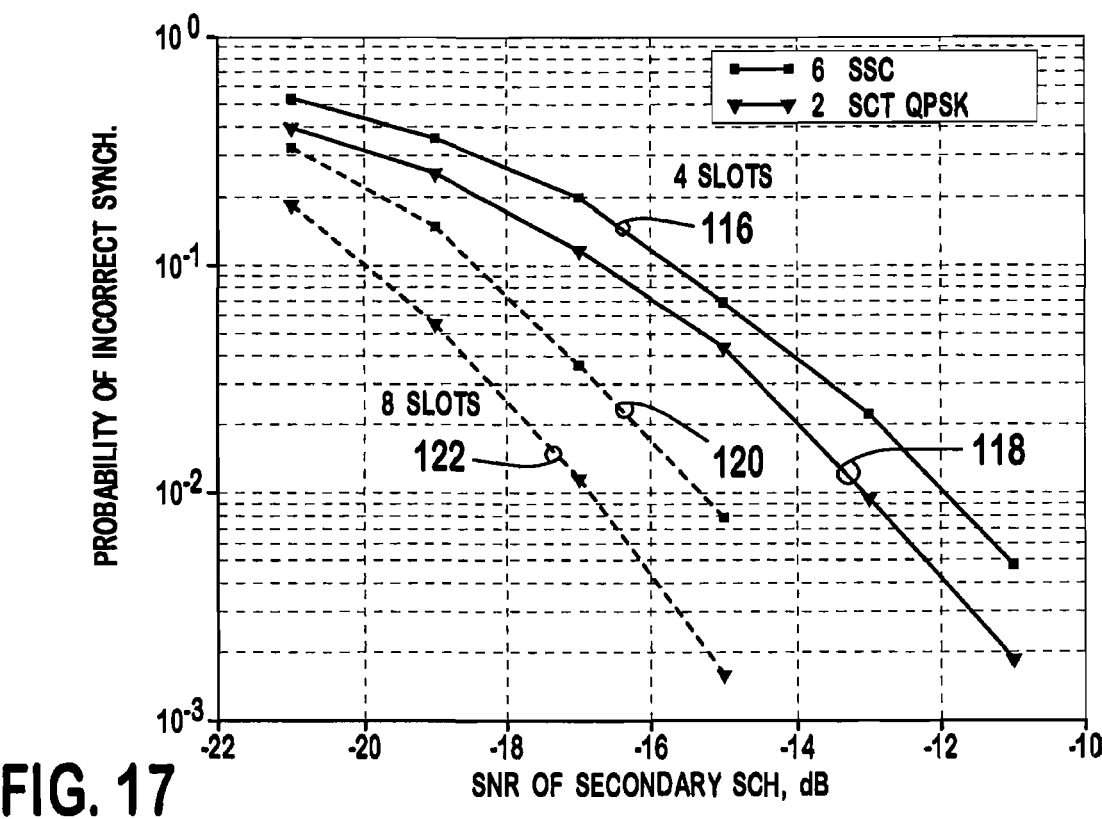

FIG. 17 illustrates the performance of BPSK and two set QPSK modulation accumulating matches over four and eight PSCH time slots. The SSCs were simulated as being transmitted over a single path Rayleigh channel. Performance for both modulation schemes improves with additional time slot correlations. Two set QPSK modulation for four PSCH time slots 116 and eight PSCH time slots 120 outperforms BPSK modulation for four PSCH time slots 118 and eight PSCH time slots 122, respectively.

What is claimed is:

1. A time division duplex (TDD) user equipment (UE) configured to synchronize to a TDD base station, the UE comprising:
   an antenna configured to receive a signal from the TDD base station;
   a primary synchronization code matched filter configured to determine a primary synchronization code from the received signal;
   a first plurality of secondary synchronization code matched filters configured to determine a first plurality of secondary synchronization codes sent on a first carrier from the received signal, wherein the first plurality of secondary synchronization codes are quadrature phased shift keyed (QPSK) modulated and the first carrier is an in-phase (I) carrier;
   a second plurality of secondary synchronization code matched filters configured to determine a second plurality of secondary synchronization codes sent on a second carrier from the received signal, wherein the second plurality of secondary synchronization codes are QPSK modulated and the second carrier is a quadrature (Q) carrier; and
   a processor in communication with the primary synchronization code matched filter and plurality of secondary synchronization code matched filters, the processor configured to determine a code group assignment and selected timeslot based upon an analysis of the secondary synchronization codes sent on the first and second carriers.

2. The TDD user equipment of claim 1 wherein each of the first and second plurality of secondary synchronization codes correspond to a row of a Hadamard matrix.

3. The TDD user equipment of claim 1 wherein there are 32 code groups.

4. The TDD user equipment of claim 3 wherein the first plurality of secondary synchronization codes is assigned to a first group of codes out of the 32 code groups and the second plurality of secondary synchronization codes is assigned to a second group of codes out of the 32 code groups.

5. The TDD user equipment of claim 4 wherein the first plurality of secondary synchronization codes is assigned to a lower group and the second plurality of secondary synchronization codes is assigned to a higher group.

* * * * *

UNITED STATES PATENT AND TRADEMARK OFFICE
CERTIFICATE OF CORRECTION

PATENT NO.           : 8,130,730 B2                              Page 1 of 1
APPLICATION NO.      : 12/499918
DATED                : March 6, 2012
INVENTOR(S)          : Sezgin et al.

It is certified that error appears in the above-identified patent and that said Letters Patent is hereby corrected as shown below:

ON THE TITLE PAGE

At Section (56) OTHER PUBLICATIONS, page 2, right column, line 43, after "UMTS" delete "Terretrial" and insert --Terrestrial--.

At Section (56) OTHER PUBLICATIONS, page 2, right column, line 48, before "(Mar. 22-26, 1999).", delete "TSGR#3(99)213" and insert --TSGR1#3(99)213--.

At Section (56) OTHER PUBLICATIONS, page 2, right column, line 60, after "Good Properties" insert --in Presence--.

IN THE SPECIFICATION

At column 1, line 43, after "to communicate", insert --with--.

At column 2, line 2, after "length 256", delete "Hadamarad" and insert --Hadamard--.

At column 2, line 6, after "row of the", delete "Hadamarad" and insert --Hadamard--.

At column 4, line 52, after "rows of", delete "Hadamarak" and insert --Hadamard--.

At column 4, line 53, before "matrix is", delete "Hadamarak" and insert --Hadamard--.

At column 4, line 64, after "rows of", delete "Hadamarak" and insert --Hadamard--.

At column 4, line 66, delete equation 10 and insert --$C_{k,n}(i) = b_k,n \times h_{r(k)}(i) \times y(i)$, where $i = 0, 1, ..., 255$ and $k = 1, ..., 6$--.

Signed and Sealed this
Twenty-fourth Day of July, 2012

David J. Kappos
*Director of the United States Patent and Trademark Office*